US010546240B1

United States Patent
Resnick et al.

(10) Patent No.: US 10,546,240 B1
(45) Date of Patent: *Jan. 28, 2020

(54) FEATURE AND CASE IMPORTANCE AND CONFIDENCE FOR IMPUTATION IN COMPUTER-BASED REASONING SYSTEMS

(71) Applicant: Diveplane Corporation, Raleigh, NC (US)

(72) Inventors: Michael Resnick, Raleigh, NC (US); Christopher James Hazard, Durham, NC (US)

(73) Assignee: Diveplane Corporation, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,866

(22) Filed: Sep. 13, 2018

(51) Int. Cl.
*G06N 5/04* (2006.01)
*G06K 9/62* (2006.01)
*G05B 17/02* (2006.01)
*G06N 20/00* (2019.01)

(52) U.S. Cl.
CPC ............... *G06N 5/04* (2013.01); *G05B 17/02* (2013.01); *G06K 9/6298* (2013.01); *G06N 20/00* (2019.01)

(58) Field of Classification Search
CPC .......... G06N 7/005; G06N 20/00; G06N 5/04; G05B 17/02; G06K 9/6298
See application file for complete search history.

(56) References Cited

U.S. PATENT DOCUMENTS

| 8,818,919 B2 * | 8/2014 | Natarajan | G06Q 30/00 706/12 |
| 9,443,194 B2 * | 9/2016 | Chu | G06N 5/025 |
| 2008/0279434 A1 * | 11/2008 | Cassill | G06Q 10/06 382/131 |
| 2014/0200930 A1 * | 7/2014 | Zizzamia | G06F 17/18 705/4 |
| 2017/0330109 A1 * | 11/2017 | Maughan | G06N 5/04 |
| 2018/0081914 A1 * | 3/2018 | Zoll | G06F 11/3452 |

OTHER PUBLICATIONS

Gauthier Doquire and Michel Verleysen, "Feature selection with missing data using mutual information estimators", Mar. 22, 2012, Neurocomputing 90 (2012), pp. 3-11. (Year: 2012).*

(Continued)

*Primary Examiner* — Kamran Afshar
*Assistant Examiner* — Ying Yu Chen
(74) *Attorney, Agent, or Firm* — Dority & Manning, P.A.

(57) ABSTRACT

Techniques are provided for imputation in computer-based reasoning systems. The techniques include performing the following until there are no more cases in a computer-based reasoning model with missing fields for which imputation is desired: determining which cases have fields to impute (e.g., missing fields) in the computer-based reasoning model and determining conviction scores for the cases that have fields to impute. The techniques proceed by determining for which cases to impute data based on the conviction scores. For each of the determined one or more cases with missing fields to impute data is imputed for the missing field, and the case is modified with the imputed data. Control of a system is then caused using the updated computer-based reasoning model.

19 Claims, 5 Drawing Sheets

(56) References Cited

OTHER PUBLICATIONS

Petteri Packalen, Hailemariam Temesgen, and Matti Maltamo, "Variable selection strategies for nearest neighbor imputation methods used in remote sensing based forest inventory", 2012, Can. J. Remote Sensing, vol. 38, No. 5, pp. 1-13. (Year: 2012).*
Abramson, "The Expected-Outcome Model of Two-Player Games", PhD Thesis, Columbia University, New York, New York, 1987, 125 pages.
Abuelaish et al., "Analysis and Modelling of Groundwater Salinity Dynamics in the Gaza Strip", Cuadernos Geograficos, vol. 57, Issue 2, pp. 72-91.
Agarwal et al., "Nearest-Neighbor Searching Under Uncertainty II", ACM Transactions on Algorithms, vol. 13, Issue 1, Article 3, 2016, 25 pages.
Aggarwal et al., "On the Surprising Behavior of Distance Metrics in High Dimensional Space", International Conference on Database Theory, London, United Kingdom, Jan. 4-6, 2001, pp. 420-434.
Akaike, "Information Theory and an Extension of the Maximum Likelihood Principle", Proceedings of the $2^{nd}$ International Symposium on Information Theory, Sep. 2-8, 1971, Tsahkadsor, Armenia, pp. 267-281.
Alpaydin, "Machine Learning: The New AI", MIT Press, Cambridge, Massachusetts, 2016, 225 pages.
Alpaydin, "Voting Over Multiple Condensed Nearest Neighbor", Artificial Intelligence Review, vol. 11, 1997, pp. 115-132.
Altman, "An Introduction to Kernel and Nearest-Neighbor Nonparametric Regression", The American Statistician, vol. 46, Issue 3, 1992, pp. 175-185.
Archer et al., "Empirical Characterization of Random Forest Variable Importance Measures", Computational Statistics & Data Analysis, vol. 52, 2008, pp. 2249-2260.
Beyer et al., "When is 'Nearest Neighbor' Meaningful?" International Conference on Database Theory, Springer, Jan. 10-12, 1999, Jerusalem, Israel, pp. 217-235.
Cano et al., "Evolutionary Stratified Training Set Selection for Extracting Classification Rules with Tradeoff Precision-Interpretability" Data and Knowledge Engineering, vol. 60, 2007, pp. 90-108.
Chomboon et al., An Empirical Study of Distance Metrics for k-Nearest Neighbor Algorithm, $3^{rd}$ International Conference on Industrial Application Engineering, Kitakyushu, Japan, Mar. 28-31, 2015, pp. 280-285.
Dwork et al., "The Algorithmic Foundations of Differential Privacy", Foundations and Trends in Theoretical Computer Science, vol. 9, Nos. 3-4, 2014, pp. 211-407.
Efros et al., "Texture Synthesis by Non-Parametric Sampling", International Conference on Computer Vision, Sep. 20-25, 1999, Corfu, Greece, 6 pages.
Gao et al., "Efficient Estimation of Mutual Information for Strongly Dependent Variables", $18^{th}$ International Conference on Artificial Intelligence and Statistics, San Diego, California, May 9-12, 2015, pp. 277-286.
Gehr et al., "$AI^2$: Safety and Robustness Certification of Neural Networks with Abstract Interpretation", $39^{th}$ IEEE Symposium on Security and Privacy, San Francisco, California, May 21-23, 2018, 16 pages.
Gemmeke et al., "Using Sparse Representations for Missing Data Imputation in Noise Robust Speech Recognition", European Signal Processing Conference, Lausanne, Switzerland, Aug. 25-29, 2008, 5 pages.
Goodfellow et al., "Deep Learning", 2016, 800 pages.
Google AI Blog, "The What-If Tool: Code-Free Probing of Machine Learning Models", Sep. 11, 2018, https://pair-code,github.io/what-if-tool, retrieved on Mar. 14, 2019, 5 pages.
Gottlieb et al., "Near-Optimal Sample Compression for Nearest Neighbors", Advances in Neural Information Processing Systems, Montreal, Canada, Dec. 8-13, 2014, 9 pages.
Hastie et al., "The Elements of Statistical Learning", 2001, 764 pages.
Hinneburg et al., "What is the Nearest Neighbor in High Dimensional Spaces?", $26^{th}$ International Conference on Very Large Databases, Cairo, Egypt, Sep. 10-14, 2000, pp. 506-515.
Hmeidi et al., "Performance of KNN and SVM Classifiers on Full Word Arabic Articles", Advanced Engineering Informatics, vol. 22, Issue 1, 2008, pp. 106-111.
Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.
Indyk et al., "Approximate Nearest Neighbors: Towards Removing the Curse of Dimensionality", Procedures of the $30^{th}$ ACM Symposium on Theory of Computing, Dallas, Texas, May 23-26, 1998, pp. 604-613.
Kittler, "Feature Selection and Extraction", Handbook of Pattern Recognition and Image Processing, Jan. 1986, Chapter 3, pp. 115-132.
Kohavi et al., "Wrappers for Feature Subset Selection", Artificial Intelligence, vol. 97, Issues 1-2, Dec. 1997, pp. 273-323.
Kontorovich et al., "Nearest-Neighbor Sample Compression: Efficiency, Consistency, Infinite Dimensions", Advances in Neural Information Processing Systems, 2017, pp. 1573-1583.
Kulkarni et al., "Hierarchical Deep Reinforcement Learning: Integrating Temporal Abstraction and Intrinsic Motivation", arXiv:1604.06057v2, May 31, 2016, 14 pages.
Kuramochi et al., "Gene Classification using Expression Profiles: A Feasibility Study", Technical Report TR 01-029, Department of Computer Science and Engineering, University of Minnesota, Jul. 23, 2001, 18 pages.
Leinster et al., "Maximizing Diversity in Biology and Beyond", Entropy, vol. 18, Issue 3, 2016, 23 pages.
Liao et al., "Similarity Measures for Retrieval in Case-Based Reasoning Systems", Applied Artificial Intelligence, vol. 12, 1998, pp. 267-288.
Lin et al., "Why Does Deep and Cheap Learning Work So Well?" Journal of Statistical Physics, vol. 168, 2017, pp. 1223-1247.
Lukaszyk, "Probability Metric, Examples of Approximation Applications in Experimental Mechanics", PhD Thesis, Cracow University of Technology, 2003, 149 pages.
Lukaszyk, "A New Concept of Probability Metric and its Applications in Approximation of Scattered Data Sets", Computational Mechanics, vol. 33, 2004, pp. 299-304.
Mann et al., "On a Test of Whether One or Two Random Variables is Stochastically Larger than the Other", The Annals of Mathematical Statistics, 1947, pp. 50-60.
Martino et al., "A Fast Universal Self-Tuned Sampler within Gibbs Sampling", Digital Signal Processing, vol. 47, 2015, pp. 68-83.
Mohri et al., Foundations of Machine Learning, 2012, 427 pages—uploaded as Part 1 and Part 2.
Olson et al., "PMLB: A Large Benchmark Suite for Machine Learning Evaluation and Comparison", arXiv:1703.00512v1, Mar. 1, 2017, 14 pages.
Pedregosa et al., "Machine Learning in Python", Journal of Machine Learning Research, vol. 12, 2011, pp. 2825-2830.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the $56^{th}$ Annual Meeting of the Association for Computational Linguistics (Long Papers), Melbourne, Australia, Jul. 15-20, 2018, pp. 340-350.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.

(56) References Cited

OTHER PUBLICATIONS

Ribeiro et al., "'Why Should I Trust You': Explaining the Predictions of Any Classifier", arXiv:1602.04938v3, Aug. 9, 2016, 10 pages.
Schaul et al., "Universal Value Function Approximators", International Conference on Machine Learning, Lille, France, Jul. 6-11, 2015, 9 pages.
Schuh et al., "Mitigating the Curse of Dimensionality for Exact KNN Retrieval", Proceedings of the 26th International Florida Artificial Intelligence Research Society Conference, St. Pete Beach, Florida, May 22-24, 2014, pp. 363-368.
Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Stoppiglia et al., "Ranking a Random Feature for Variable and Feature Selection" Journal of Machine Learning Research, vol. 3, 2003, pp. 1399-1414.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7th international Conference on Hybrid Artificial Intelligent Systems, Salamanca, Spain, Mar. 28-30, 2012, 38 pages.
Trautmann et al., "On the Distribution of the Desimbility Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Wachter et al., "Counterfactual Explanations Without Opening the Black Box: Automated Decisions and the GDPR", Harvard Journal of Law and Technology, vol. 31, No. 2, Spring 2018, 47 pages.
Wang et al., "Falling Rule Lists" 18th International Conference on Artificial Intelligence and Statistics, San Diego, California, May 9-12, 2015, 10 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

* cited by examiner

500

|  | Feature 511 | Feature 512 | Feature 513 | ... |
|---|---|---|---|---|
| Case 520 | 14.1 | 10.1 | 2.3 |  |
| Case 521 | 15.3 | Null | 3.4 |  |
| Case 522 | Null | 1.1 | Null |  |
| Case 523 | 7.8 | 9.7 | 5.6 |  |

FIG. 5

FEATURE AND CASE IMPORTANCE AND CONFIDENCE FOR IMPUTATION IN COMPUTER-BASED REASONING SYSTEMS

FIELD OF THE INVENTION

The present invention relates to computer-based reasoning systems and more specifically to imputing data in computer-based reasoning systems.

BACKGROUND

Input or training data is incredibly important for computer-based reasoning systems. Even when there are sufficient cases (e.g., training data) to make a useful computer-based reasoning model, the data for each of the cases may lack some of the data items (fields) within the case. Consider, for example, a data set collected over a long period of time for oil pumps. Earlier oil pumps may have lacked many of the sensors and data collection mechanisms used on later oil pumps. Further, even if the older oil pumps are retrofitted with the sensors and data collection mechanisms used in more modern pumps, the data collected before those additional sensors and collection mechanisms will lack the data associated with those later-added sensors/mechanisms. As such, this earlier data cannot be used for training computer-based reasoning models.

The techniques herein overcome these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims provide a summary of the invention.

BRIEF DESCRIPTION OF THE DRAWINGS

In the drawings:

FIG. 5 is a table depicting missing fields for cases in a computer-based reasoning model.

DETAILED DESCRIPTION

Figure 1:
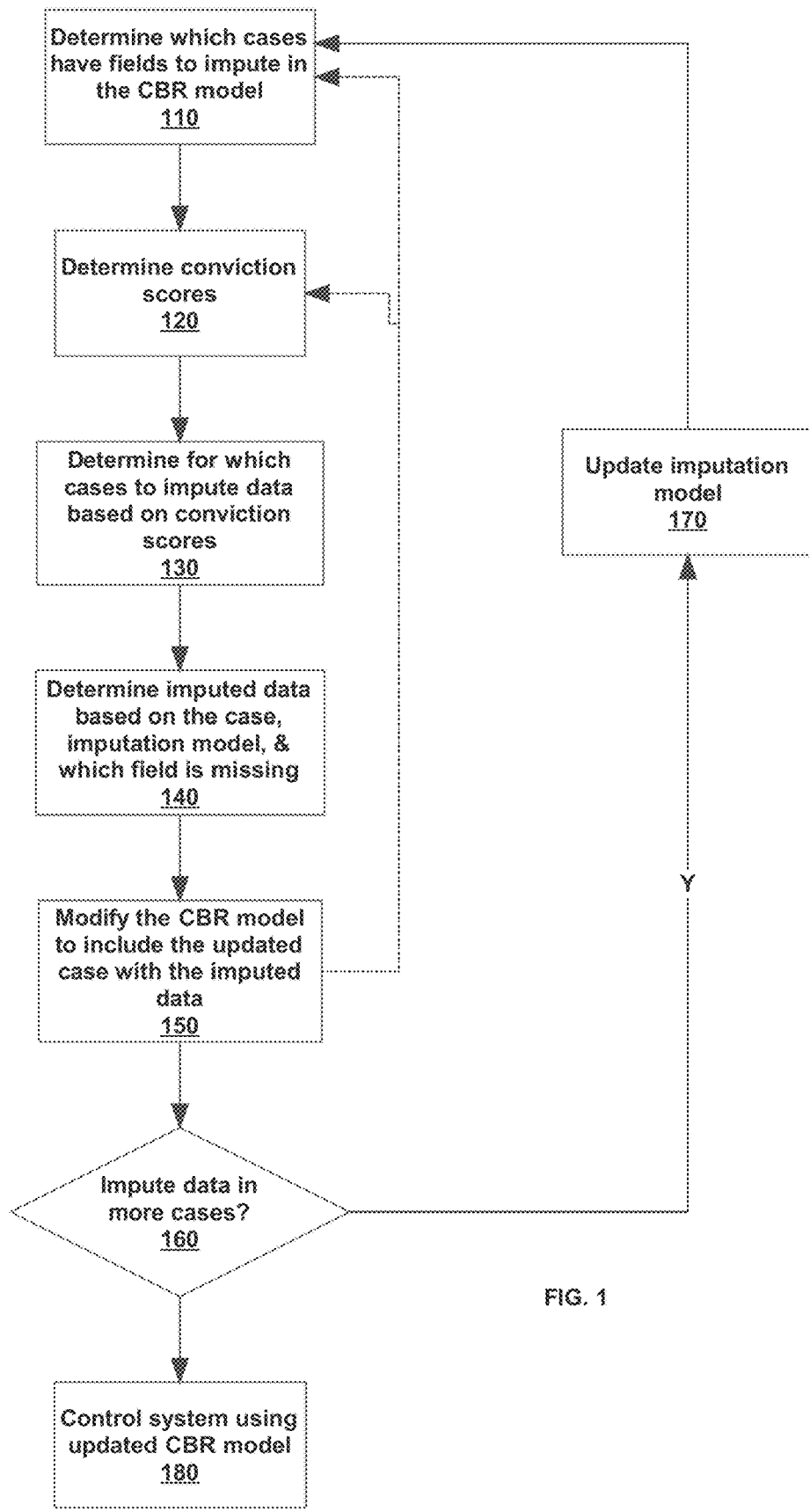
FIG. 1 is a flow diagram depicting example processes for feature and case importance and confidence for imputation in computer-based reasoning systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In computer-based reasoning systems, such as case-based reasoning systems, having the appropriate data, and having that data be as complete as possible can be key to success when controlling a system with such a computer-based reasoning system. Numerous types of systems can be controlled with computer-based reasoning systems, such as vehicles, federated device systems, manufacturing equipment, and the like. Numerous examples computer-based reasoning systems being used to control other systems are given throughout herein.

An issue with much training data for computer-based reasoning systems is that the data can be incomplete, which is sometimes known as "sparse" data. Consider, for example, a company that has been drilling oil for many years. As alluded to above, the older pumps may not have had all of the sensors that the current pumps have. Therefore, data from the older pumps may not have all of the "features" of data from the newer pumps. Even if the older pumps are retrofitted with newer sensors in order to obtain the same data as newer pumps, the older data from the older pumps will still be missing data for sensors that weren't there at the time of collection. Additionally, even if all of the pumps have the same sensors, data can be lost or corrupted, and/or the sensors can fail, each of which causes certain features to be missing from certain cases.

The techniques discussed herein address some of the issues of sparse data being used in computer-based reasoning systems, sometimes referred to as semi-supervised learning. The techniques generally proceed by analyzing the cases in a computer-based reasoning model and determining which cases have missing fields. In some embodiments, conviction scores are then determined for the cases, and the cases and/or the features of the computer-based reasoning model are then ordered by conviction. In some embodiments, conviction score is a broad term encompassing it plain and ordinary meaning, including the certainty (e.g., as a certainty function) that a particular set of data fits a model, the confidence that a particular set of data conforms to the model, or the importance of a feature or case with regard to the model. In some embodiments, convictions scores may be determined based on confidence intervals, frequency of appearance in sets of decision trees, purity of subsections of the model, permutation feature importance, entropy measures (such as cross entropy and Kullback-Leibler (KL) divergence), variance, accuracy when dropping out data, Bayesian posterior probabilities, other scores or tests, such as goodness of fit tests, and/or using one or more of the techniques described herein. This will be discussed in more detail below. The cases with the highest conviction then have the data for the missing fields imputed based on an imputation model. The imputation model may be, for example, a supervised machine learning model that is built based on the existing data in the computer-based reasoning model. The imputed data is added into the individual case and that modified case is added into the computer-based reasoning model to create an updated computer-based reasoning model.

In some embodiments, multiple missing fields are imputed in a batch before the supervised machine learning imputation model is updated and conviction of missing fields is recomputed. In other embodiments, the machine learning imputation model and the determination of conviction for missing fields is determined after each missing field has been updated with imputed data. After the one or more missing fields have been imputed and the cases and computer-based reasoning model have been updated, the techniques return to determine whether there are any more cases in the computer-based reasoning model for which data needs to be imputed. If there are more cases for which data is missing, then conviction is again determined for those cases and/or the features related to the missing fields. Then the missing data for the cases with high conviction is imputed, and those updated cases are added into the computer-based reasoning model, and the process continues.

Once the computer-based reasoning model has been updated with the imputed data, it will be more complete, or less sparse, than it was previously. The updated computer-based reasoning model can then be used to control a system.

Processes for Feature Importance and Confidence for Imputation in Computer-Based Reasoning Systems FIG. 1 is a flow diagram depicting example processes for feature and case importance and confidence for imputation in computer-based reasoning systems. Process 100 proceeds by determining 110 which cases have fields to impute in the computer-based reasoning model. In some embodiments, data needs to be imputed when the data for a field is missing from a case. For example, in FIG. 5, data for features 511 and 513 are missing from case 522. Conviction scores are determined for the cases with missing data, and, based on the conviction scores, a determination 130 is made as to which cases to impute data. The data to impute is determined 140 based on the case with the missing data and an imputation model, such as a machine learning model. The underlying case and the computer-based reasoning model are then modified 150 to include the imputed data. As noted above, multiple missing fields for multiple cases can be computed all at once as part of a batch process, or the techniques can proceed by imputing just a single field's data before returning to determine 110 whether there are more fields to impute in the computer-based reasoning model. If there is more data to impute in the computer-based reasoning model, then the imputation model is updated 170. If there is there is no more data to impute 160, then the updated computer-based reasoning model can be used to control a real world system. Numerous examples of systems being controlled by the updated computer-based reasoning model are given throughout herein.

Returning again to the top of process 100, a determination 110 is made as to which cases have fields to impute in the computer-based reasoning model. Determining 110 which cases have data to impute can include looking at the underlying data for all of the cases in the computer-based reasoning model. When a field is missing, it can be marked so that a later determination can be made whether to impute data for that missing field. In some embodiments, a separate data structure can be used to store indications of which fields are missing from cases. In some embodiments, the missing data can be indicated directly in the data structure storing the data for the cases. For example, in some embodiments, a graphic processing unit may allow for a special identifier to be used instead of a floating point number in a data structure, such as Null, or NaN or "not a number." If a data field is missing it may be marked as Null or NaN. FIG. 5 depicts a set of cases 520-523, each with an indication of what the values for each of the features 511-513. As indicated in FIG. 5, case 521 is missing feature 512, so the corresponding field is marked as Null. The same is true for case 522 for features 511 and 513.

Once it is known which cases have fields to impute in the computer-based reasoning model, then conviction scores for those cases can be determination 120. In some embodiments, a conviction score is determined 120 for each case with missing data, for all cases in the computer-based reasoning model, etc. Determining 120 a conviction score for a particular case can be accomplished by determining the result of a certainty function for the particular case. Determining case conviction may include determining the confidence intervals, frequency of appearance values in sets of decision trees, purity of subsections of the model where the case would be classified, permutation case importance, Simpson index, entropy measures (such as cross entropy, KL divergence, Shannon entropy, symmetrized divergence, Jensen-Shannon divergence, min entropy, entropy generalizations such as Hartly and Rényi entropy), variance, accuracy when dropping out data, nearest neighbors analysis, Bayesian posterior probabilities, Pearson correlation, mutual information, Gini coefficients, Fisher information, etc. for the case. In some embodiments, not depicted in FIG. 1, influence functions are used to determine the importance of a feature or case.

In some embodiments, determining 120 conviction scores can include determining the conviction of each feature of multiple features of the cases in the computer-based reasoning model. In this context the word "feature" is being used to describe a data field as across all or some of the cases in the computer-based reasoning model. The word "field," in this context, is being used to describe the value of an individual case for a particular feature. For example, a feature for a theoretical computer-based reasoning model for self-driving cars may be "speed". The field value for a particular case for the feature of speed may be the actual speed, such as thirty five miles per hour.

Returning to determining 120 conviction scores, in some embodiments, determining the conviction of a feature may be accomplished using a certainty function, for example, by determining the feature importance. Determining the feature importance can include determining 120 the statistical significance of each feature in the data with respect to its effect on the generated model, or on a subset of the model. For example, in some embodiments, feature importance is determined 120 by determining the predictor ranking based on the contribution predictors make to the model, where the predictor may be a feature. This technique may be useful in determining whether certain features are contributing too much or little to the model. Feature importance can be determined 120 using numerous techniques. For example, feature importance may be determined 120 using confidence intervals, frequency of appearance in sets of decision trees, purity of subsections of the model, permutation feature importance, entropy measures (such as cross entropy and KL divergence), variance, accuracy when dropping out data, Bayesian posterior probabilities, or Pearson correlation. Returning to the example above, removing a speed feature from a self-driving car computer-based reasoning model could include removing all of the speed values (e.g., fields) from cases from the computer-based reasoning model and determining the conviction of adding speed back into the computer-based reasoning model. In some embodiments, the feature is not actually removed from the database, but only temporarily excluded.

After determining the conviction of the multiple features of the computer-based reasoning model those features may then be sorted by conviction. Further, the cases with missing data can have conviction scores determined 120 as described above. The determination 130 of which one or more cases with missing fields to impute data for can then be made in any appropriate manner, including, first sorting by the conviction of the features and starting with the feature with the highest conviction (or the two or more features with the highest conviction) and then choosing the cases with the highest conviction among those with missing data for the feature(s) with highest conviction. In some embodiments, the cases are sorted by conviction, without consideration of conviction related to features, and the cases with the highest conviction that have one or more missing fields, have those all or a subset of the missing one or more fields imputed. In some embodiments, the conviction of the feature is multiplied by the conviction of the case (that is missing that feature). In some embodiments, other equations can be used, such as adding the conviction of the feature to the conviction of the case, adding or multiplying the square (or other exponential power) of one or both convictions, using the maximum of the two convictions, and/or the like. The case with the highest product (or other function) of these two conviction numbers is chosen as the next case for which to impute data.

Determining 130 which cases to impute data based on the conviction scores may include determining a single case with the highest conviction. In this case, the process 100 will proceed by modifying 150 that particular case, updating 170 the imputation model, and then recomputing convictions. In some embodiments, multiple cases may be modified 150 before the imputation model is updated 170 and further cases are determined 110 for imputation. In some embodiments, the balance of the number of cases to impute data before performing updates rests on the computational cost of updating 170 the imputation model and determining 120 the conviction scores. In some embodiments, updating after fewer cases may provide more accurate or robust data imputation using the techniques herein. If computational efficiency is a stronger concern, then more cases may be modified 150 before the imputation model is updated 170 and new conviction scores are determined 120.

After determining which cases to impute data, the imputed data is determined 140 based on the case with the missing data and the imputation model. The imputation model may be any appropriate statistical or other machine learning model. For example, a supervised machine learning model may be trained based on the data in the computer-based reasoning model. For example, existing fields (e.g., fields that are not empty) for each feature may be used as the outcome variable and the rest of the features could be used as the input variables. Such a machine learning model would then be able to predict what data is missing for each missing field for each case. Examples of machine learning and other models that may be used may include any appropriate type of supervised neural network or other machine learning method can be used for determining rankings such as a feedforward neural network, a radial basis function neural network, a Kohonen self-organizing neural network, a recurrent neural network, a convolutional neural network, a modular neural network, a k-nearest neighbor approach, and/or the like.

The case and the computer-based reasoning model are then modified 150 based on the imputed data. For example, the case may be updated to copy the imputed data in the missing field (for example, replacing the Null for feature 512 for case 521). The computer-based reasoning model may then be updated to include the updated case, which will replace the previous version of that case with the modified version of that case with the imputed data.

As indicated by the dotted line from modifying 150 to determining 110 (if, for example, a new determination of cases with missing fields is needed) and determining 120 (if, for example, the system still has available the list of cases with missing fields and those cases just need new conviction scores), it may be the case that multiple cases are updated in batch using the same imputation model. Any appropriate batch size can be used, such as two, ten, twenty, one hundred, one thousand cases, etc. In some embodiments, a batch may include a percentage of the cases in the computer based reasoning system, such as 1%, 2%, 3%. In some embodiments batch size is a combination of a percentage and a fixed number. For example, the batch size may be the larger of 1% of the cases in the computer based reasoning model or 10 cases. In other embodiments, for example, it may be the lesser of 20 cases or 3% of the computer based reasoning model. As noted elsewhere herein, larger batches may be useful to improve performance and reduce computational spend. Smaller batches may provide more accurate results. In cases where the data is extremely sparse, smaller batch sized may be useful in order to increase the accuracy of the imputation of data.

Regardless of whether a single case or multiple cases are updated using the imputation model, after those one or more cases are updated and the computer-based reasoning model is modified 150, a determination is made whether there is more data to impute 160 in the computer-based reasoning model. If there is more data to impute 160 then the imputation model is updated 170 before returning control to the top of process 100. Updating 170 the imputation model may include completely retraining the imputation model based on the updated data in the computer-based reasoning model in similar manner to what is described elsewhere herein. In some embodiments, the updated data is added to the imputation model in order to update 170 the model. For example, the updated cases can be used as training data in the supervised machine learning model, in the manner similar to that described here in order to update 170 the supervised machine learning imputation model.

If there are no more cases for which dated needs to be imputed 160 then the updated computer paced reasoning model can be sued to control 180 various systems. Discussion of the control of numerous systems can be found throughout herein. In some embodiments, process 100 proceeds until there are no more missing fields in the computer-based reasoning model. In some embodiments, the process 100 will terminate earlier. For example, process 100 may terminate when the conviction for the remaining cases fall below a certain threshold. As another example, the process 100 may stop when there remain only a certain threshold number of missing cases (e.g. 100 cases, 1% of the cases, the minimum of 5% or 30 cases, etc.). In some embodiments, process 100 may terminate when the computer-based reasoning model is needed for controlling a system.

In some embodiments, not depicted in FIG. 1, imputation session data is recorded for each imputed field so that audits of explanation scan trace back to the imputation. For example, if an anomaly in the computer based reasoning model is later detected, a determination can be made whether any of the imputed data was related to the anomaly.

In some embodiments, not depicted in FIG. 1, data may be imputed as new training data is received. For example, each time a new case is received as part of training data for a computer-based reasoning model, any missing data in that training data may be imputed. The missing data may be because of a missing sensor, and/or a malfunctioning sensor.

In some embodiments, not depicted in FIG. 1, previously imputed data may also be removed and reimputed at any appropriate interval or after some criteria have been met. For example, on an hourly, daily, weekly, monthly, yearly, etc. basis, or after a sufficient volume or percentage of volume of additional data has been trained, or after the conviction, feature importance, certainty, or other measure of new or existing cases changed past certain thresholds, data that was previously imputed may be reimputed using the techniques herein. For example, if a series of new cases (e.g., 30 new cases) come in, and their average feature importance is higher (or lower) than the threshold, then the system will reimpute. The associated case and computer-based reasoning model can then be updated appropriately. In some embodiments, this periodic refreshing of the imputed data can provide a benefit if the computer based reasoning model has been augmented or in any way changed after the data was previously imputed. The deleted and reimputed data may be more accurately imputed based on the changes made to the model in the interim.

Figure 2:
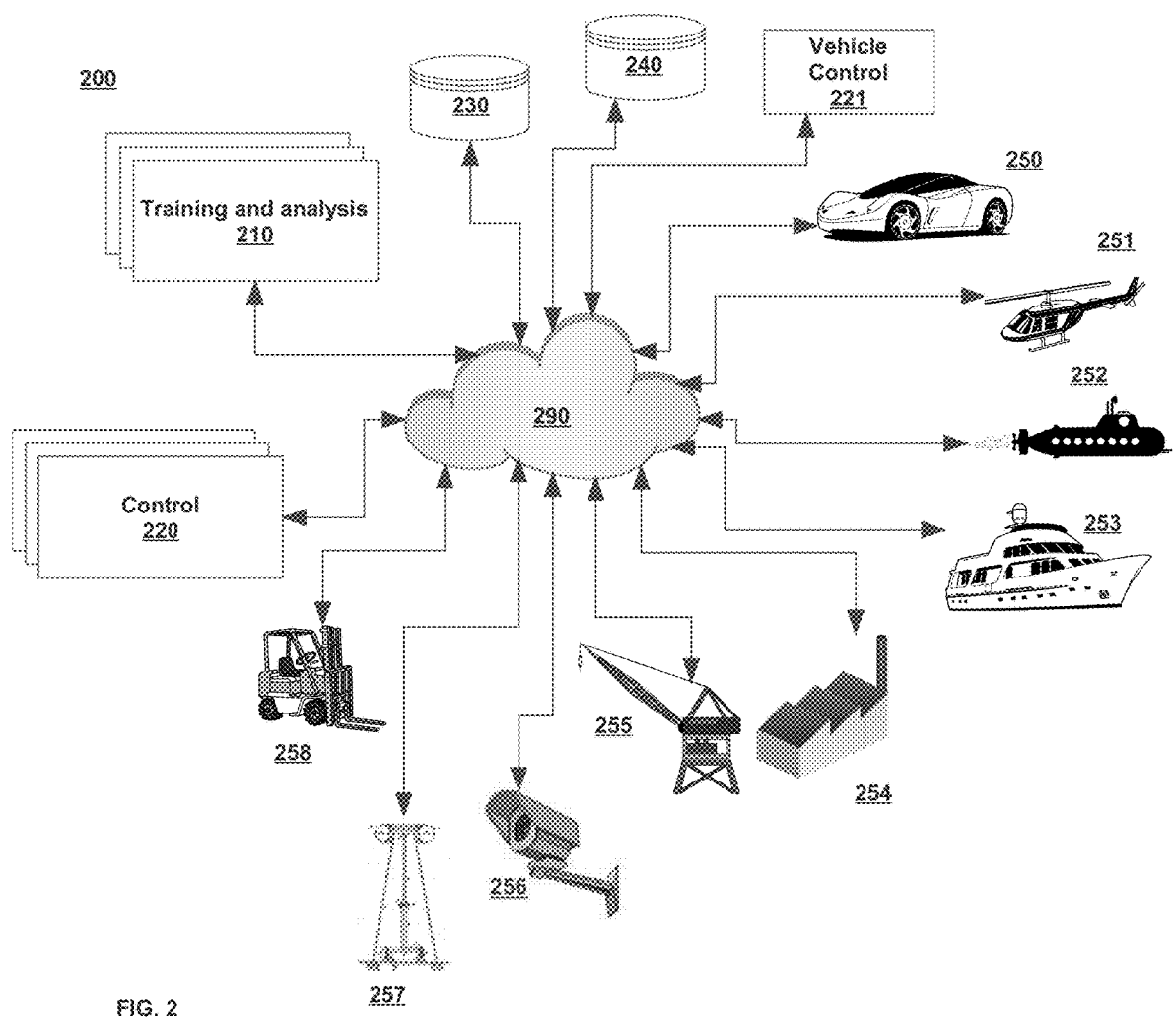
FIG. 2 is a block diagram depicting example systems for feature and case importance and confidence for imputation in computer-based reasoning systems.

Systems for Feature and Case Importance and Confidence for Imputation in Computer-Based Reasoning Systems FIG. 2 is a block diagram depicting example systems for conviction based imputation and computer based reasoning systems. Numerous devices and systems are coupled to a network 290. Network 290 can include the internet, a wide area network, a local area network, a Wi-Fi network, any other network or communication device described herein, and the like. Further, numerous of the systems and devices connected to 290 may have encrypted communication there between, VPNs, and or any other appropriate communication or security measure. System 200 includes a training and analysis system 210 coupled to network 290. The training and analysis system 210 may be used for collecting data related to systems 250-258 and creating computer based reasoning models based on the training of those systems. Further, training and analysis system 210 may perform aspects of process 100 described herein. Control system 220 is also coupled to network 290. A control system 220 may control various of the systems 250-258. For example, a vehicle control 221 may control any of the vehicles 250-253, or the like. In some embodiments, there may be one or more network attached storages 230, 240. These storages 230, 240 may store training data, computer based reasoning models, updated computer based reasoning models, audit trails of imputed data, and the like. In some embodiments, training and analysis system 210 and/or control system 220 may store any needed data including computer based reasoning models locally on the system.

FIG. 2 depicts numerous systems 250-258 that may be controlled by a control system 220 or 221. For example, automobile 250, helicopter 251, submarine 252, boat 253, factory equipment 254, construction equipment 255, security equipment 256, oil pump 257, or warehouse equipment 258 may be controlled by a control system 220 or 221.

Example Processes for Controlling Systems

Figure 4:
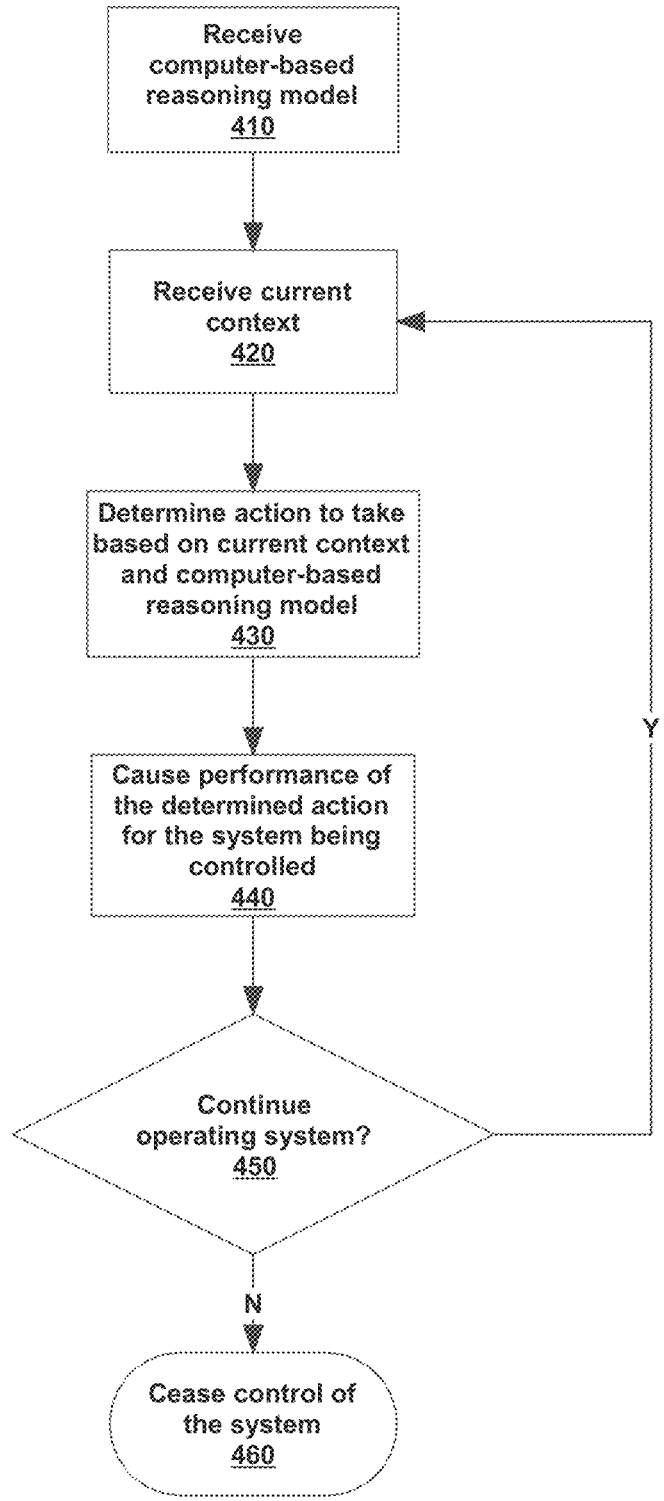
FIG. 4 is a flow diagram depicting example processes for controlling systems.

FIG. 4 depicts an example process 400 for controlling a system. In some embodiments and at a high level, the process 400 proceeds by receiving or receiving 410 a computer-based reasoning model for controlling the system. The computer-based reasoning model may be one created using process 100, as one example. In some embodiments, the process 400 proceeds by receiving 420 a current context for the system, determining 430 an action to take based on the current context and the computer-based reasoning model, and causing 440 performance of the determined action (e.g., labelling an image, causing a vehicle to perform the turn, lane change, waypoint navigation, etc.). If operation of the system continues 450, then the process returns to receive 420 the current context, and otherwise discontinues 460 control of the system.

As discussed herein the various processes 100, 400, etc. may run in parallel, in conjunction, together, or one process may be a subprocess of another. Further, any of the processes may run on the systems or hardware discussed herein. The features and steps of processes 100 and 400 could be used in combination and/or in different orders.

Self-Driving Vehicles

Returning to the top of the process 400, it begins by receiving 410 a computer-based reasoning model for controlling the system. The computer-based reasoning model may be received in any appropriate matter. It may be provided via a network 290, placed in a shared or accessible memory on either the training and analysis system 210 or control system 220, or in accessible storage, such as storage 230 or 240.

In some embodiments (not depicted in FIG. 4), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 400 begins (not depicted in FIG. 4), and the process begins by receiving 420 the current context. For example, the computer-based reasoning model may already be loaded into a controller 220 and the process 400 begins by receiving 420 the current context for the system being controlled. In some embodiments, referring to FIG. 2, the current context for a system to be controlled (not depicted in FIG. 2) may be sent to control system 220 and control system 220 may receive 420 current context for the system.

Receiving 420 current context may include receiving the context data needed for a determination to be made using the computer-based reasoning model. For example, turning to the vehicular example, receiving 420 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 430 an action to take based on the current context and the computer-based reasoning model. For example, turning to the vehicular example, an action to take is determined 430 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest to the current context may be determined. In some embodiments, only the closest context-action pair is determined, and the action associated with that context-action pair is the determined 430 action. In some embodiments, multiple context-action pairs are determined 430. For example, the N "closest" context-action pairs may be determined 430, and either as part of the determining 430, or later as part of the causing 440 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, psuedometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 4). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 4). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 430 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 4). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 430 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 430 action is then caused 440. Turning to the vehicular example, causing 440 performance of the action may include direct control of the vehicle and/or sending a message to a system, device, or interface that can control the vehicle. The action sent to control the vehicle may also be translated before it is used to control the vehicle. For example, the action determined 430 may be to navigate to a particular waypoint. In such an embodiment, causing 440 performance of the action may include sending the waypoint to a navigation system, and the navigation system may then, in turn, control the vehicle on a finer-grained level. In other embodiments, the determined 430 action may be to switch lanes, and that instruction may be sent to a control system that would enable the car to change the lane as directed. In yet other embodiments, the action determined 430 may be lower-level (e.g., accelerate or decelerate, turn 4° to the left, etc.), and causing 440 performance of the action may include sending the action to be performed to a control of the vehicle, or controlling the vehicle directly. In some embodiments, causing 440 performance of the action includes sending one or more messages for interpretation and/or display. In some embodiments, the causing 440 the action includes indicating the action to be taken at one or more levels of a control hierarchy for a vehicle. Examples of control hierarchies are given elsewhere herein.

Some embodiments include detecting anomalous actions taken or caused 440 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 220 may determine 430 what action to take for the helicopter based on the received 420 context. The vehicle control 220 may then cause the helicopter to perform the determined action, for example, by sending instructions related to the action to the appropriate controls in the helicopter. In the driving example, the vehicle control 220 may determine 430 what action to take based on the context of vehicle. The vehicle control may then cause 440 performance of the determined 430 action by the automobile by sending instructions to control elements on the vehicle.

If there are more 450 contexts for which to determine actions for the operation of the system, then the process 400 returns to receive 410 more current contexts. Otherwise, process 400 ceases 460 control of the system. Turning to the vehicular example, as long as there is a continuation of operation of the vehicle using the vehicle control rules, the process 400 returns to receive 420 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 400 will discontinue 460 autonomous control of the vehicle.

Many of the examples discussed herein for vehicles discuss self-driving automobiles. As depicted in FIG. 2, numerous types of vehicles can be controlled. For example, a helicopter 251 or drone, a submarine 252, or boat or freight ship 253, or any other type of vehicle such as plane or drone (not depicted in FIG. 2), construction equipment, (not depicted in FIG. 2), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be applied in the context of an image-labeling system. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, process 100 may include determining the surprisal of each image (or multiple images) and the associated labels or of the aspects of the computer-based reasoning model. The surprisal for the one or more images may be determined and a determination may be made whether to select or include the one or more images (or aspects) in the image-labeling computer-based reasoning model based on the determined surprisal. While there are more sets of one or more images with labels to assess, the process 100 may return to determine whether more image or label sets should be included or whether aspects should be included and/or changed in the model. Once there are no more images or aspects to consider, the process 100 can turn to controlling 180 the image analysis system using the image-labeling computer-based reasoning.

In some embodiments, the techniques include performing the following until there are no more cases in a computer-based reasoning model with missing fields for which imputation is desired: determining 110 which images have fields to impute (e.g., missing fields, e.g., in the metadata of the image) in the computer-based reasoning model and determining 120 conviction scores for the images that have fields to impute. The techniques proceed by determining 130 for which images to impute data based on the conviction scores. For each of the determined one or more images with missing fields to impute data is imputed for the missing field, and the image is modified with the imputed data (e.g., adding the imputed metadata to the image file). Once there are no more images or aspects for which to impute data, the process 100 can turn to controlling 180 the image analysis system using the image-labeling computer-based reasoning.

Controlling 180 an image-labeling system may be accomplished by process 400. For example, if the data elements are related to images and labels applied to those images, then the image-labeling computer-based reasoning model trained on that data will apply labels to incoming images. Process 400 proceeds by receiving 410 an image-labeling computer-based reasoning model. The process proceeds by receiving 420 an image for labeling. The image-labeling computer-based reasoning model is then used to determine 430 labels for the input image. The image is then labeled 440. If there are more 450 images to label, then the system returns to receive 410 those images and otherwise ceases 460. In such embodiments, the image-labeling computer-based reasoning model may be used to select labels based on which training image is "closest" to the incoming image. The label(s) associated with that image will then be selected to apply to the incoming image.

Manufacturing and Assembly

The process 100 may also be applied in the context of manufacturing and/or assembly. For example, conviction can be used to identify normal behavior versus anomalous behavior of such equipment. Using the techniques herein, a crane (e.g., crane 255 of FIG. 2), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is some sort breakdown, unusual wear and tear or mechanical or other malfunction, an unusual component or seed or crop, etc. It can also be used to find damaged equipment for repairs or buffing or other improvements for any robots that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

In some embodiments, process 100 may determine (e.g., in response to a request) the surprisal of one or more data elements (e.g., of the manufacturing equipment) or aspects (e.g., features of context-action pairs or aspects of the model) to potentially include in the manufacturing control computer-based reasoning model. The surprisal for the one or more manufacturing elements may be determined and a determination may be made whether to select or include the one or more manufacturing data elements or aspects in the manufacturing control computer-based reasoning model based on the determined surprisal. While there are more sets of one or more manufacturing data elements or aspects to assess, the process 100 may return to determine whether more manufacturing data elements or aspects sets should be included. Once there are no more manufacturing data elements or aspects to consider, the process 100 can turn to controlling 180 the manufacturing system using the manufacturing control computer-based reasoning system.

In some embodiments, the techniques include performing the following until there are no more cases in a computer-based reasoning model with missing fields for which imputation is desired: determining 110 which cases have fields to impute (e.g., missing fields in the manufacturing data elements) in the computer-based reasoning model and determining 120 conviction scores for the cases that have fields to impute. The techniques proceed by determining 130 for which cases to impute data based on the conviction scores. For each of the determined one or more cases with missing fields to impute data is imputed for the missing field, and the case is modified with the imputed data (e.g., adding the imputed metadata to the case file). Once there are no more cases or aspects for which to impute data, the process 100 can turn to controlling 180 the manufacturing analysis system using the manufacturing-control computer-based reasoning.

Controlling 180 a manufacturing system may be accomplished by process 400. For example, if the data elements are related to manufacturing data elements or aspects, then the manufacturing control computer-based reasoning model trained on that data will control manufacturing or assemble. Process 400 proceeds by receiving 410 a manufacturing control computer-based reasoning model. The process proceeds by receiving 420 a context. The manufacturing control computer-based reasoning model is then used to determine 430 an action to take. The action is then performed by the control system (e.g., caused by the manufacturing control computer-based reasoning system). If there are more 450 contexts to consider, then the system returns to receive 410 those contexts and otherwise ceases 460. In such embodiments, the manufacturing control computer-based reasoning model may be used to control a manufacturing system. The chosen actions are then performed by a control system.

Smart Voice Control

The process 100 may also be applied in the context of smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, process 100 may determine (e.g., in response to a request) the surprisal of one or more data elements (e.g., of the smart voice system) or aspects (e.g., features of the data or parameters of the model) to potentially include in the smart voice system control computer-based reasoning model. The surprisal for the one or more smart voice system data elements or aspects may be determined 140 and a determination may be made whether to include the one or more smart voice system data elements or aspects in the smart voice system control computer-based reasoning model based on the determined surprisal. While there are more sets of one or more smart voice system data elements or aspects to assess, the process 100 may return to determine whether more smart voice system data elements or aspects sets should be included. Once there are no more smart voice system data elements or aspects to consider, the process 100 can turn to controlling 180 the smart voice system using the smart voice system control computer-based reasoning model.

In some embodiments, the techniques include performing the following until there are no more cases in a computer-based reasoning model with missing fields for which imputation is desired: determining 110 which cases have fields to impute (e.g., missing fields in the smart voice data elements) in the computer-based reasoning model and determining 120 conviction scores for the cases that have fields to impute. The techniques proceed by determining 130 for which cases to impute data based on the conviction scores. For each of the determined one or more cases with missing fields to impute data is imputed for the missing field, and the case is modified with the imputed data (e.g., adding the imputed metadata to the case file). Once there are no more cases or aspects for which to impute data, the process 100 can turn to controlling 180 the smart voice analysis system using the smart voice-control computer-based reasoning.

Controlling 180 a smart voice system may be accomplished by process 400. For example, if the data elements are related to smart voice system actions, then the smart voice system control computer-based reasoning model trained on that data will control smart voice systems. Process 400 proceeds by receiving 410 a smart voice computer-based reasoning model. The process proceeds by receiving 420 a context. The smart voice computer-based reasoning model is then used to determine 430 an action to take. The action is then performed by the control system (e.g., caused by the smart voice computer-based reasoning system). If there are more 450 contexts to consider, then the system returns to receive 410 those contexts and otherwise ceases 460. In such embodiments, the smart voice computer-based reasoning model may be used to control a smart voice system. The chosen actions are then performed by a control system.

Control of Federarted Devices

The process 100 may also be applied in the context of federated devices in a system. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, process 100 may determine the surprisal of one or more data elements or aspects of the federated device control system for potential inclusion in the federated device control computer-based reasoning model. The surprisal for the one or more federated device control system data elements may be determined and a determination may be made whether to select or include the one or more federated device control system data elements in the federated device control computer-based reasoning model based on the determined surprisal. While there are more sets of one or more federated device control system data elements or aspects to assess, the process 100 may return to determine whether more federated device control system data elements or aspect sets should be included. Once there are no more federated device control system data elements or aspects to consider, the process 100 can turn to controlling 180 the federated device control system using the federated device control computer-based reasoning model.

In some embodiments, the techniques include performing the following until there are no more cases in a computer-based reasoning model with missing fields for which imputation is desired: determining 110 which cases have fields to impute (e.g., missing fields in the federated device data elements) in the computer-based reasoning model and determining 120 conviction scores for the cases that have fields to impute. The techniques proceed by determining 130 for which cases to impute data based on the conviction scores. For each of the determined one or more cases with missing fields to impute data is imputed for the missing field, and the case is modified with the imputed data (e.g., adding the imputed metadata to the case file). Once there are no more cases or aspects for which to impute data, the process 100 can turn to controlling 180 the federated device analysis system using the federated device control computer-based reasoning.

Controlling 180 a federated device system may be accomplished by process 400. For example, if the data elements are related to federated device system actions, then the federated device control computer-based reasoning model trained on that data will control federated device control system. Process 400 proceeds by receiving 410 a federated device control computer-based reasoning model. The process proceeds by receiving 420 a context. The federated device control computer-based reasoning model is then used to determine 430 an action to take. The action is then performed by the control system (e.g., caused by the federated device control computer-based reasoning system). If there are more 450 contexts to consider, then the system returns to receive 410 those contexts and otherwise ceases 460. In such embodiments, the federated device control computer-based reasoning model may be used to control federated devices. The chosen actions are then performed by a control system.

Control and Automation of Experiments

The process 100 may also be used in the context of control systems for laboratory experiments. For example, many lab experiments today, especially in the biological and life sciences, but also in materials science and others, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility functions. Automated lab experiments may have actuators and may put different chemicals, samples, or parts in different combinations and put them under different circumstances. Using conviction to guide the machines enables them to hone in on learning how the system under study responds to different scenarios, and, for example, searching areas of greatest uncertainty. Conceptually speaking, when the surprisal is combined with a value function, especially in a multiplicative fashion, then the combination is a powerful information theoretic take on the classic exploration vs exploitation trade-offs that are made in search processes from artificial intelligence to science to engineering. Additionally, such a system can be made to automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. If the system has multiple kinds of sensors that have "costs" (e.g., monetary, time, computation, etc.) or cannot be all activated simultaneously, the feature entropies could be used to activate or deactivate the sensors to reduce costs or improve the distinguishability of the experimental results.

In some embodiments, process 100 may determine (e.g., in response to a request) the surprisal of one or more data elements or aspects of the experiment control system. The surprisal for the one or more experiment control system data elements or aspects may be determined and a determination may be made whether to select or include the one or more experiment control system data elements or aspects in experiment control computer-based reasoning model based on the determined surprisal. While there are more sets of one or more experiment control system data elements or aspects to assess, the process 100 may return to determine whether more experiment control system data elements or aspects sets should be included. Once there are no more experiment control system data elements or aspects to consider, the process 100 can turn to controlling 180 the experiment control system using the experiment control computer-based reasoning model.

In some embodiments, the techniques include performing the following until there are no more cases in a computer-based reasoning model with missing fields for which imputation is desired: determining 110 which cases have fields to impute (e.g., missing fields in the experiment control data elements) in the computer-based reasoning model and determining 120 conviction scores for the cases that have fields to impute. The techniques proceed by determining 130 for which cases to impute data based on the conviction scores. For each of the determined one or more cases with missing fields to impute data is imputed for the missing field, and the case is modified with the imputed data (e.g., adding the imputed metadata to the case file). Once there are no more cases or aspects for which to impute data, the process 100 can turn to controlling 180 the experiment control system using the experiment control computer-based reasoning.

Controlling 180 an experiment control system may be accomplished by process 400. For example, if the data elements are related to experiment control system actions, then the experiment control computer-based reasoning model trained on that data will control experiment control system. Process 400 proceeds by receiving 410 an experiment control computer-based reasoning model. The process proceeds by receiving 420 a context. The experiment control computer-based reasoning model is then used to determine 430 an action to take. The action is then performed by the control system (e.g., caused by the experiment control computer-based reasoning system). If there are more 450 contexts to consider, then the system returns to receive 410 those contexts and otherwise ceases 460. In such embodiments, the experiment control computer-based reasoning model may be used to control experiment. The chosen actions are then performed by a control system.

Control of Energy Transfer Systems

The process 100 may also be applied in the context of control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, process 100 may determine (e.g., in response to a request) the surprisal of one or more data elements or aspects of the energy transfer system. The surprisal for the one or more energy transfer system data elements or aspects may be determined and a determination may be made whether to select or include the one or more energy transfer system data elements or aspects in energy control computer-based reasoning model based on the determined surprisal. While there are more sets of one or more energy transfer system data elements or aspects to assess, the process 100 may return to determine whether more energy transfer system data elements or aspects should be included. Once there are no more energy transfer system data elements or aspects to consider, the process 100 can turn to controlling 180 the energy transfer system using the energy control computer-based reasoning model.

In some embodiments, the techniques include performing the following until there are no more cases in a computer-based reasoning model with missing fields for which imputation is desired: determining 110 which cases have fields to impute (e.g., missing fields in the energy control data elements) in the computer-based reasoning model and determining 120 conviction scores for the cases that have fields to impute. The techniques proceed by determining 130 for which cases to impute data based on the conviction scores. For each of the determined one or more cases with missing fields to impute data is imputed for the missing field, and the case is modified with the imputed data (e.g., adding the imputed metadata to the case file). Once there are no more cases or aspects for which to impute data, the process 100 can turn to controlling 180 the energy transfer system using the energy transfer control computer-based reasoning.

Controlling 180 an energy transfer system may be accomplished by process 400. For example, if the data elements are related to energy transfer system actions, then the energy control computer-based reasoning model trained on that data will control energy transfer system. Process 400 proceeds by receiving 410 an energy control computer-based reasoning model. The process proceeds by receiving 420 a context. The energy control computer-based reasoning model is then used to determine 430 an action to take. The action is then performed by the control system (e.g., caused by the energy control computer-based reasoning system). If there are more 450 contexts to consider, then the system returns to receive 410 those contexts and otherwise ceases 460. In such embodiments, the energy control computer-based reasoning model may be used to control energy. The chosen actions are then performed by a control system.

Example Control Hierarchies

In some embodiments, the technique herein may use a control hierarchy to control systems and/or cause actions to be taken (e.g., as part of controlling 180 in FIG. 1). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:

Primitive Layer—Active vehicle abilities (accelerate, decelerate), lateral, elevation, and orientation movements to control basic vehicle navigation Behavior Layer—Programmed vehicle behaviors which prioritize received actions and directives and prioritize the behaviors in the action.

Unit Layer—Receives orders from command layer, issues moves/directives to the behavior layer.

Command Layers (hierarchical)—Receives orders and gives orders to elements under its command, which may be another command layer or unit layer.

Example Cases, Data Elements, Contexts, and Operational Situations

In some embodiments, the cases or data elements may include context data and action data in context-action pairs. Further, cases may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
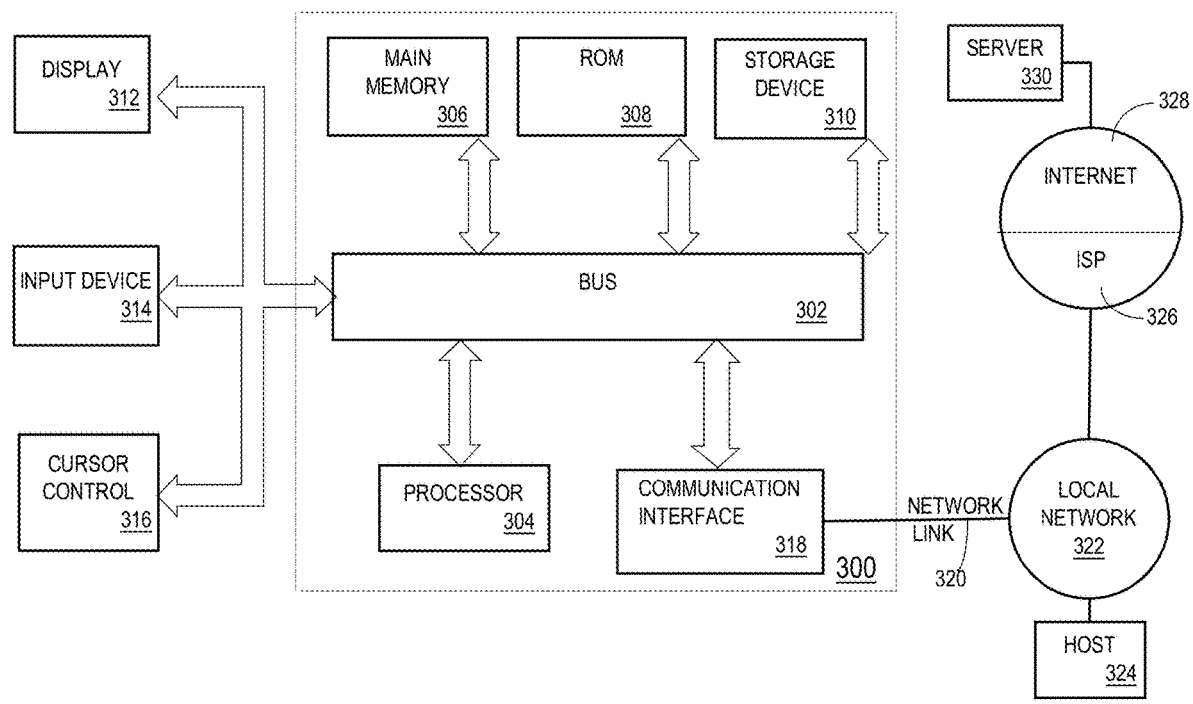
FIG. 3 is a block diagram of example hardware for feature and case importance and confidence for imputation in computer-based reasoning systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    performing the following until there are no more cases in a computer-based reasoning model with missing fields for which imputation is desired:
    determining which cases have fields to impute in the computer-based reasoning model;
    determining conviction scores for the cases that have fields to impute in the computer-based reasoning model;
    determining conviction score of each feature of multiple features of the cases in the computer-based reasoning model based on a certainty function associated with:
    removing the feature from the cases in the computer-based reasoning model;

adding the feature back into the computer-based reasoning model,
wherein the certainty function is associated with a certainty that a particular set of data fits a model;
determining for which one or more cases with missing fields to impute data for the missing fields based on the conviction scores, wherein determining for which one or more cases with missing fields to impute data for the missing fields based on the conviction scores comprises:
determining which particular feature of multiple features has a highest conviction score, and
determining to impute data for the missing fields for the one or more cases with the highest conviction score that are missing the particular feature that has the highest conviction score;
for each of the determined one or more cases with missing fields to impute:
determining imputed data for a missing field of the missing fields based on the case, and an imputation model, and the missing fields in the case;
modifying the case with the imputed data, wherein the modified case becomes part of the computer-based reasoning model in place of the original case to create an updated computer-based reasoning model;
causing, with a control system, control of a system with the updated computer-based reasoning model,
wherein the method is performed by one or more computing devices.

2. The method of claim 1, wherein causing control of the system comprises:
receiving a request for an action to take in the system, including a context for the system;
determining the action to take based at least in part on the context for the system and the updated computer-based reasoning model;
causing the control system to perform the determined action in the system.

3. The method of claim 1, wherein determining for which one or more cases with missing fields to impute data comprises:
determining a case with the highest conviction score.

4. The method of claim 1, wherein determining for which one or more cases with missing fields to impute data comprises:
determining two or more cases with the highest conviction score.

5. The method of claim 1, wherein determining imputed data for the missing field comprises:
determining the imputed data based on a machine learning model for the computer-based reasoning model's data, wherein the machine learning model for the computer-based reasoning model's data has been trained using the data in the computer-based reasoning model.

6. The method of claim 5, further comprising:
determining an update to the machine learning model based on the updated computer-based reasoning model.

7. One or more non-transitory storage media storing instructions which, when executed by one or more computing devices, cause performance of a method of:
performing the following until there are no more cases in a computer-based reasoning model with missing fields for which imputation is desired:
determining which cases have fields to impute in the computer-based reasoning model;
determining conviction scores for the cases that have fields to impute in the computer-based reasoning model;
determining conviction score of each feature of multiple features of the cases in the computer-based reasoning model based on a certainty function associated with:
removing the feature from the cases in the computer-based reasoning model;
adding the feature back into the computer-based reasoning model,
wherein the certainty function is associated with a certainty that a particular set of data fits a model;
determining for which one or more cases with missing fields to impute data for the missing fields based on the conviction scores, wherein determining for which one or more cases with missing fields to impute data for the missing fields based on the conviction scores comprises:
determining which particular feature of multiple features has a highest conviction score, and
determining to impute data for the missing fields for the one or more cases with the highest conviction score that are missing the particular feature that has the highest conviction score;
for each of the determined one or more cases with missing fields to impute:
determining imputed data for a missing field of the missing fields based on the case, and an imputation model, and the missing fields in the case;
modifying the case with the imputed data, wherein the modified case becomes part of the computer-based reasoning model in place of the original case to create an updated computer-based reasoning model;
causing, with a control system, control of a system with the updated computer-based reasoning model.

8. The one or more non-transitory storage media of claim 7, wherein causing control of the system comprises:
receiving a request for an action to take in the system, including a context for the system;
determining the action to take based at least in part on the context for the system and the updated computer-based reasoning model;
causing the control system to perform the determined action in the system.

9. The one or more non-transitory storage media of claim 7, wherein determining for which one or more cases with missing fields to impute data comprises:
determining a case with the highest conviction score.

10. The one or more non-transitory storage media of claim 7, wherein determining for which one or more cases with missing fields to impute data comprises:
determining two or more cases with the highest conviction score.

11. The one or more non-transitory storage media of claim 7, wherein determining imputed data for the missing field comprises:
determining the imputed data based on a machine learning model for the computer-based reasoning model's data, wherein the machine learning model for the computer-based reasoning model's data has been trained using the data in the computer-based reasoning model.

12. The one or more non-transitory storage media of claim 11, the method further comprising:
determining an update to the machine learning model based on the updated computer-based reasoning model.

13. A system comprising one or more computing devices, which one or more computing devices are configured to perform a method of:
  performing the following until there are no more cases in a computer-based reasoning model with missing fields for which imputation is desired:
    determining which cases have fields to impute in the computer-based reasoning model;
    determining conviction scores for the cases that have fields to impute in the computer-based reasoning model;
    determining conviction score of each feature of multiple features of the cases in the computer-based reasoning model based on a certainty function associated with:
      removing the feature from the cases in the computer-based reasoning model;
      adding the feature back into the computer-based reasoning model,
      wherein the certainty function is associated with a certainty that a particular set of data fits a model;
    determining for which one or more cases with missing fields to impute data for the missing fields based on the conviction scores, wherein determining for which one or more cases with missing fields to impute data for the missing fields based on the conviction scores comprises:
      determining which particular feature of multiple features has a highest conviction score, and
      determining to impute data for the missing fields for the one or more cases with the highest conviction score that are missing the particular feature that has the highest conviction score;
    for each of the determined one or more cases with missing fields to impute:
      determining imputed data for a missing field of the missing fields based on the case, and an imputation model, and the missing fields in the case;
      modifying the case with the imputed data, wherein the modified case becomes part of the computer-based reasoning model in place of the original case to create an updated computer-based reasoning model;
  causing, with a control system, control of a system with the updated computer-based reasoning model.

14. The system of claim 13, wherein determining imputed data for the missing field comprises:
  determining the imputed data based on a machine learning model for the computer-based reasoning model's data, wherein the machine learning model for the computer-based reasoning model's data has been trained using the data in the computer-based reasoning model.

15. The system of claim 13, wherein causing control of the system comprises:
  receiving a request for an action to take in the system, including a context for the system;
  determining the action to take based at least in part on the context for the system and the updated computer-based reasoning model;
  causing the control system to perform the determined action in the system.

16. The system of claim 13, wherein determining for which one or more cases with missing fields to impute data comprises:
  determining a case with the highest conviction score.

17. The system of claim 13, wherein determining for which one or more cases with missing fields to impute data comprises:
  determining two or more cases with the highest conviction score.

18. The system of claim 13, wherein determining imputed data for the missing field comprises:
  determining the imputed data based on a machine learning model for the computer-based reasoning model's data, wherein the machine learning model for the computer-based reasoning model's data has been trained using the data in the computer-based reasoning model.

19. The system of claim 18, wherein the method further comprises:
  determining an update to the machine learning model based on the updated computer-based reasoning model.

* * * * *